5 Sheets—Sheet 1

W. A. MILES & J. H. BURGHARDT.
Hot-Blast Oven.

No. 208,915.      Patented Oct. 15, 1878.

Witnesses;
Harry C. Clark
Mamie C. Stallings

Inventors.
Wm A. Miles,
and
John Burghardt.
by H. W. Beadle & Co
Attys.

5 Sheets—Sheet 2.

W. A. MILES & J. H. BURGHARDT.
Hot-Blast Oven.

No. 208,915. Patented Oct. 15, 1878.

Witnesses:
Harry C. Clark
Mamie C. Stallings

Inventors,
Wm. A. Miles
and
John Burghardt
by H. W. Beadle Leo
Attys

W. A. MILES & J. H. BURGHARDT.
Hot-Blast Oven.
No. 208,915. Patented Oct. 15, 1878.
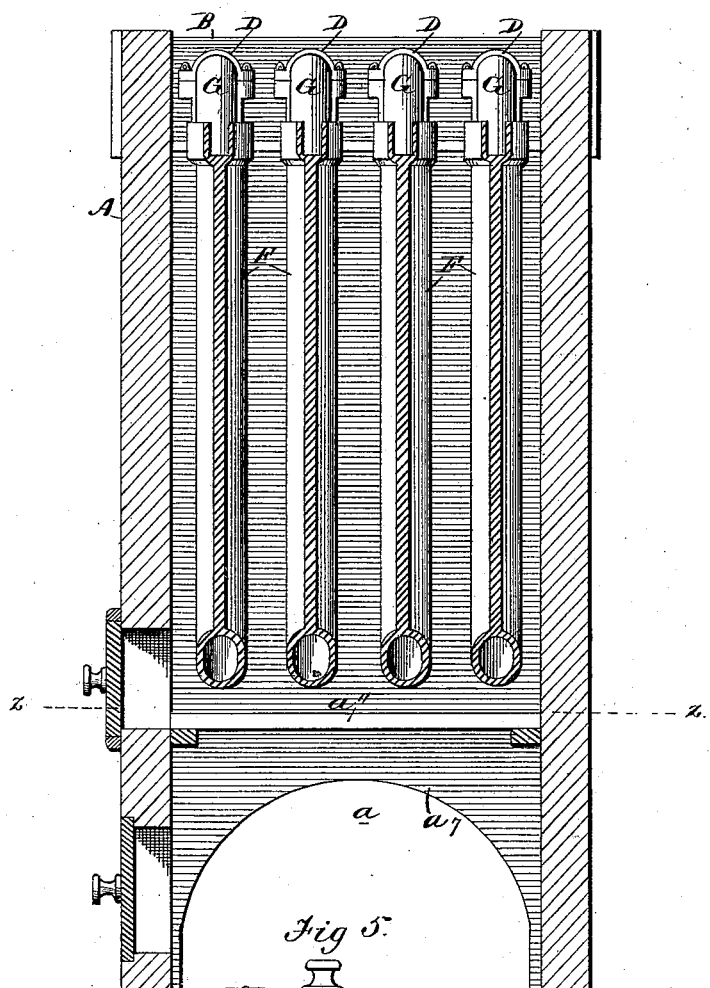
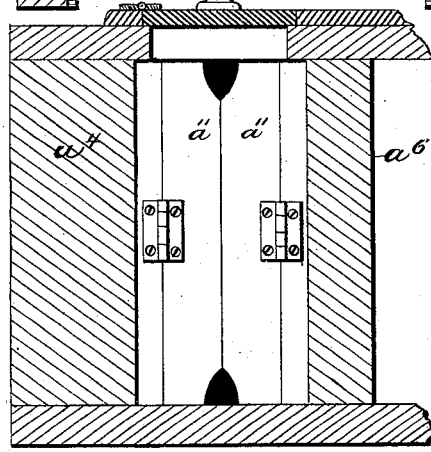

5 Sheets—Sheet 4.
W. A. MILES & J. H. BURGHARDT.
Hot-Blast Oven.
No. 208,915. Patented Oct. 15, 1878.
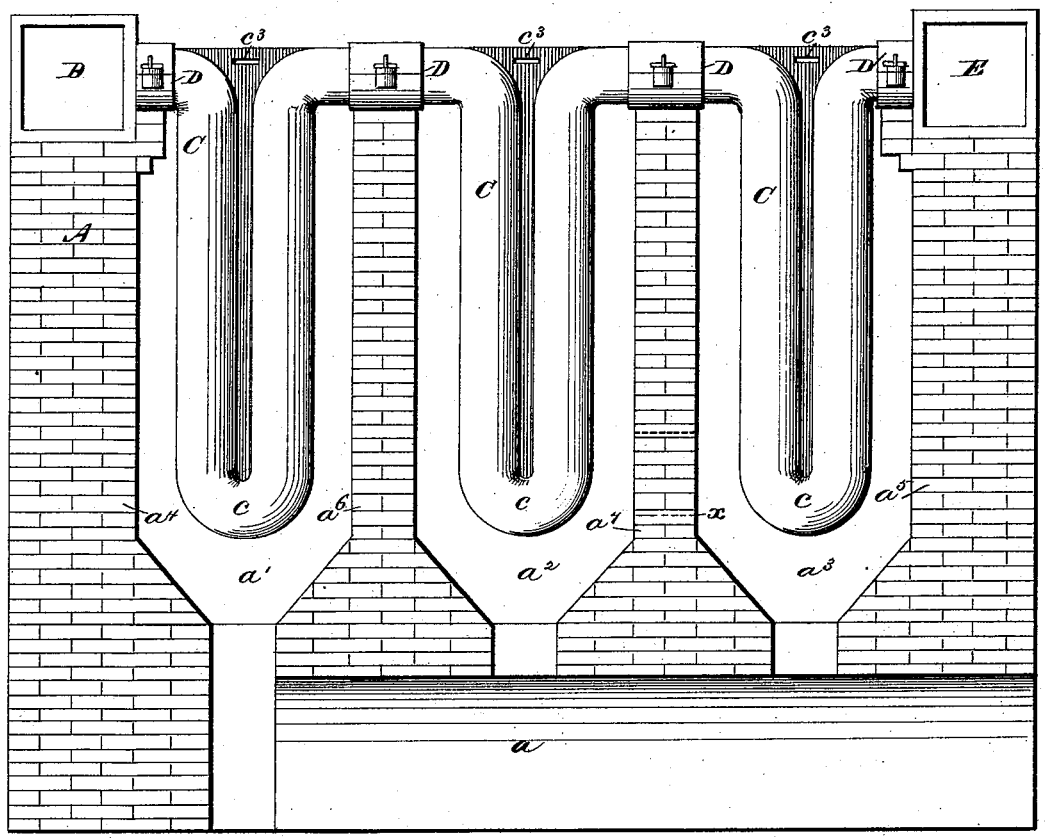
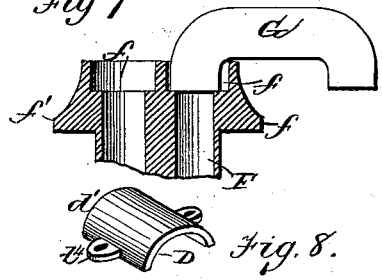
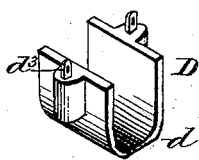
Witnesses:
Harry C. Clark
Mamie B. Stallings
Inventors:
Wm. A. Miles
and
Jno. Burghardt
by H. W. Beadle & Co.
Attys 5 Sheets—Sheet 5.

W. A. MILES & J. H. BURGHARDT.
Hot-Blast Oven.

No. 208,915. Patented Oct. 15, 1878.

Witnesses:
Harry C. Clarks
Mamie B. Stallings

Inventors.
Wm. A. Miles.
and
John Burghardt.
by H. W. Beadle & Co.
Attys

UNITED STATES PATENT OFFICE.

WILLIAM A. MILES, OF COPAKE IRON WORKS, NEW YORK, AND JOHN H. BURGHARDT, OF CURTISVILLE, MASSACHUSETTS.

IMPROVEMENT IN HOT-BLAST OVENS.

Specification forming part of Letters Patent No. 208,915, dated October 15, 1878; application filed February 20, 1877.

*To all whom it may concern:*

Be it known that we, WILLIAM A. MILES, of Copake Iron Works, in the county of Columbia and State of New York, and JOHN H. BURGHARDT, of Curtisville, in the county of Berkshire and State of Massachusetts, have invented a new and Improved Hot-Blast Oven for Furnaces; and we do hereby declare that the following is a full and exact description of the same, reference being had to the accompanying drawings, and to the letters of reference marked thereon.

This invention relates to that class of hot-blast ovens in which the air-pipe is suspended from above; and it consists, mainly, in certain details of construction which will be fully described hereinafter.

Figure 1:
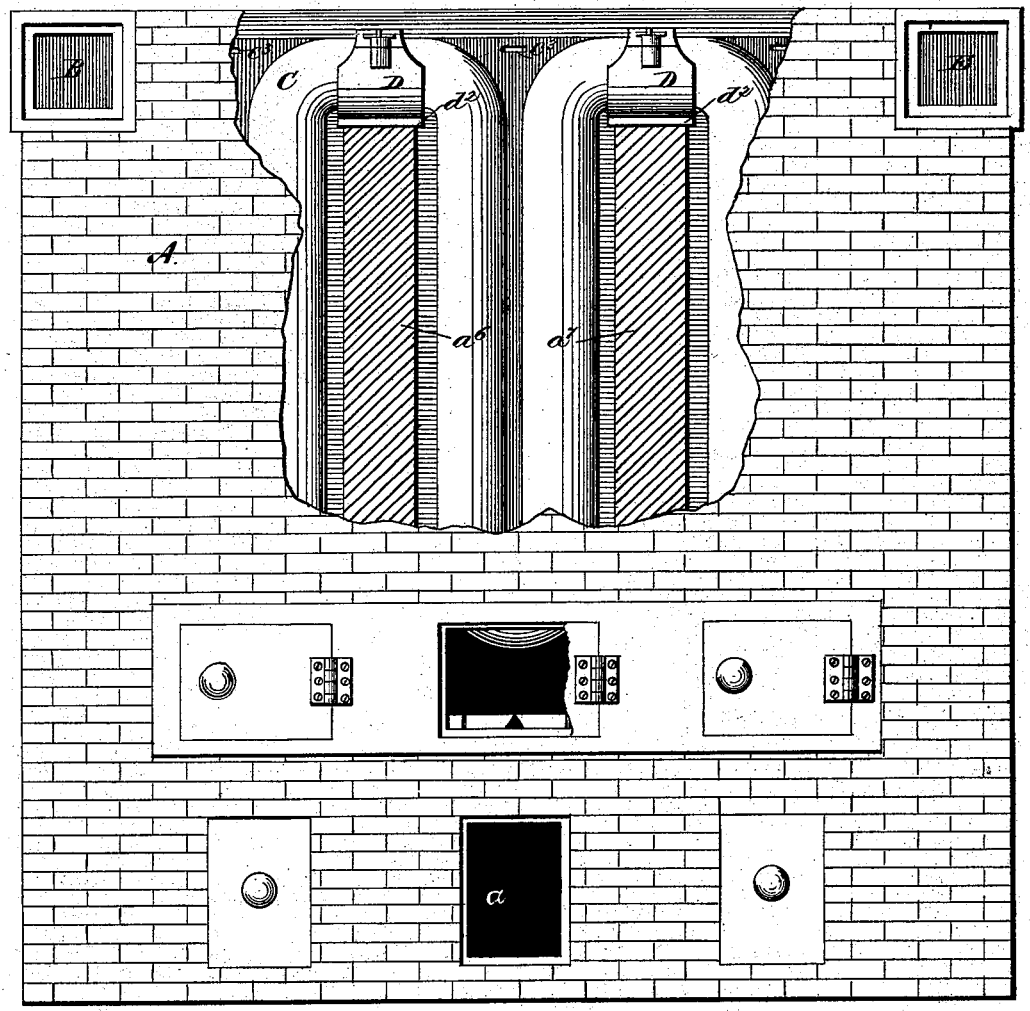
Figure 2:
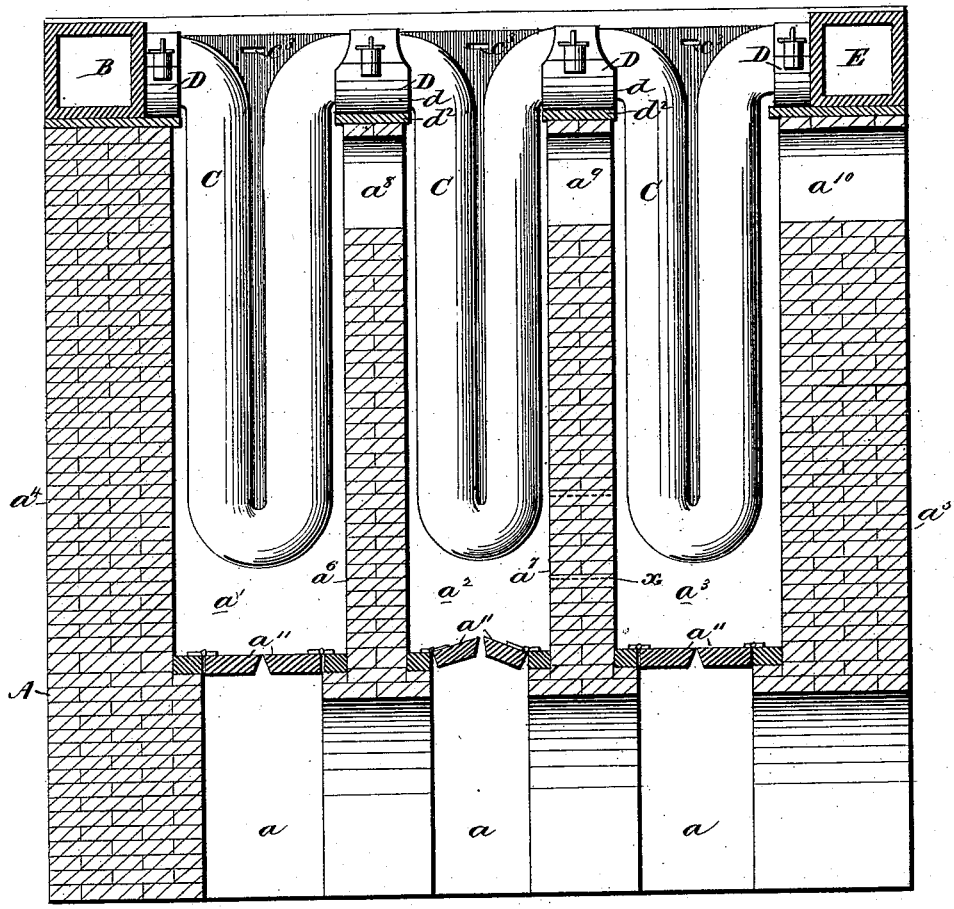
Figure 3:
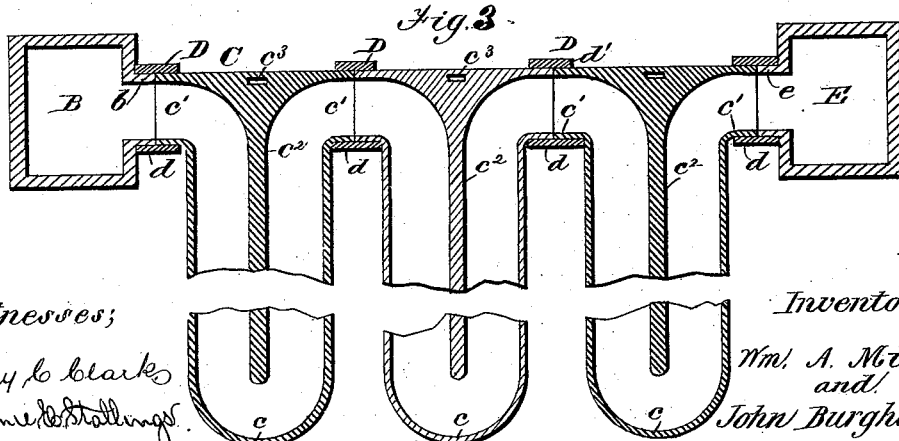

In the drawings, Figure 1 represents a side elevation of our invention, partially broken away to show the interior; Fig. 2, a sectional elevation of the same, taken on line $x x$, Fig. 9; Fig. 3, a sectional elevation taken on line $y y$, Fig. 9; Fig. 4, a transverse vertical sectional elevation; Fig. 5, a partial transverse horizontal section on line $z z$, Fig. 4; Fig. 6, a vertical sectional elevation, showing a modified form of flue; Figs. 7, 8, 10, and 11, detail views of various parts, and Fig. 9 a plan view of the oven with top removed.

To enable others skilled in the art to make and use our invention, we will now proceed to describe fully its construction and manner of operation.

A represents the brick-work of the oven, constructed generally of any proper size and suitable proportions. $a$ represents the combustion-chamber, located in the base of the oven, into which are discharged, in any suitable manner, the waste flame and gas from the furnace-top.

Figure 9:
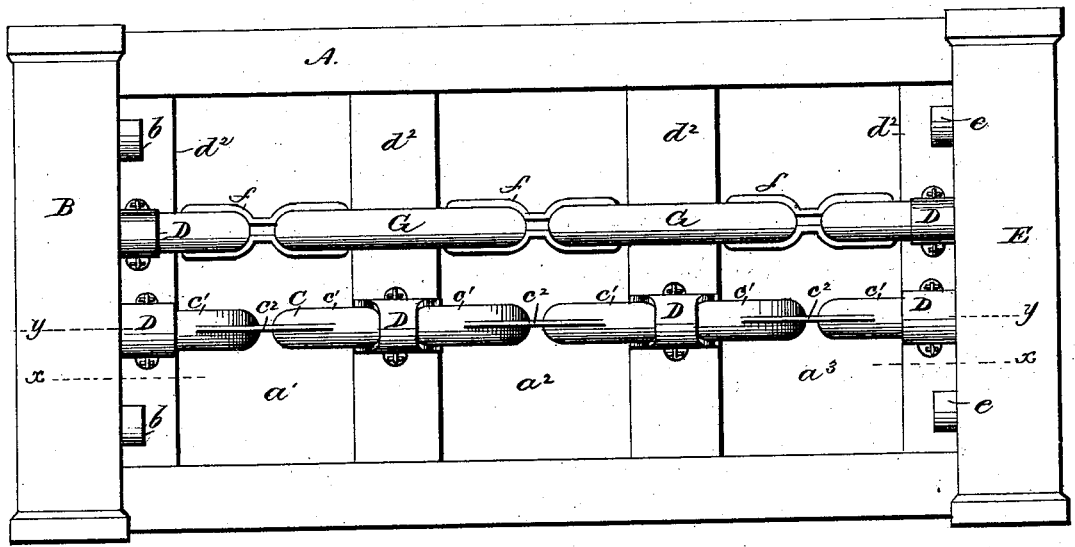

$a^1$ $a^2$ $a^3$, Figs. 2, 6, and 9, represent flues formed by the outside walls, $a^4$ $a^5$, and the intermediate division-walls, $a^6$ $a^7$, into which the flame or gas is discharged from the combustion-chamber, as shown.

$a^8$ $a^9$, Fig. 2, represent proper openings in the division-walls, by means of which the gas is permitted to pass onward to the discharge-opening $a^{10}$ leading into the chimney.

If desired, instead of the opening $a^9$, an opening, $x$, may be employed, as shown in dotted lines, Figs. 2 and 6, in which case the circulation of the gas, of course, will be correspondingly changed.

$a^{11}$ $a^{11}$ represent dampers adapted for adjustment by any proper means, for the purpose of controlling the flow of gas into the flues $a^1$, $a^2$, and $a^3$. These flues, it will be observed, are provided below with long narrow openings, through which the gas enters, the extent of the opening, of course, being determined by the position of the dampers.

B represents a bed-pipe located at one end of the oven at or near the top of the same, which is provided at proper points with the branch discharge-pipes $b$ $b$, as shown.

C represents the air-pipe through which the air-blast from pipe B is conveyed. This consists of a series of independent sections united to form a continuous pipe by proper coupling devices, hereinafter described.

Figure 11:
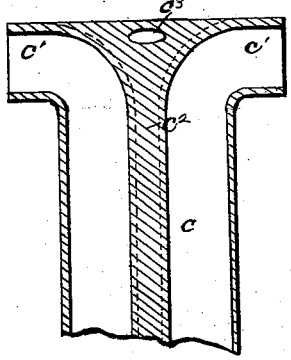

$c$, Fig. 11, represents an individual section, consisting of a U-shaped pipe or tube having right-angled arms $c^1$, as shown, and an intervening web, $c^2$, preferably cast in one piece with the leg, by means of which the latter are rigidly united together. $c^3$ represents an opening in the web near its top, which is adapted to receive a hook or other device for lifting it into or out of position.

D, Figs. 1, 2, and 8, represents a coupling or packing sleeve adapted to unite two sections together, or the end section of the series to one of the branches of the bed-pipes. This consists of a base-piece, $d$, adapted to rest upon the iron plate $d^2$, which covers the division and outside walls, and a removable cap-piece, $d^1$, which is properly secured to the base-piece, when the pipes are in place, by the fastening devices $d^3$ $d^4$, or other proper means. These coupling-sleeves are packed with iron borings or other suitable material, in the usual well-known or other proper manner.

E represents a bed-pipe, into which the hot-air blast from the air-pipes is discharged through proper branches, $e$ $e$, and from which it is conveyed to the tuyeres.

The air-pipe, it will be observed, is located at right angles to the longitudinal center line of the flue-chambers, so that each of its sides is equally exposed to the action of the gas and flame. A modified form of pipe and coupling is shown in Figs. 4, 7, 9, and 10, and will now be described.

Figure 10:
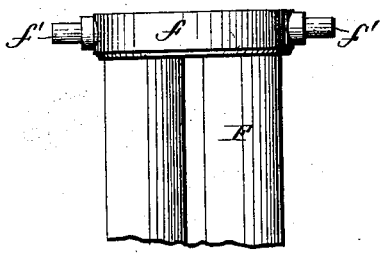

F, Figs. 7 and 10, represents an individual section of the pipe having the U-shaped form and intervening web hereinbefore described; but which is provided at its upper end with the socket-enlargement $f$ and the supporting-lugs $f^1$, as shown. G represents a double elbow, the ends of which are adapted to rest in the socket-bearings and unite the sections together, as shown.

The operation of my improved oven will be readily understood. The gas and flame from the furnace-top are passed through the combustion-chamber into the flues in which the sections of the air-pipe are suspended, and thence through the discharge-openings to the chimney-stack. The air is forced through the continuous pipe to the tuyeres, being highly heated, of course, in its passage.

Some of the advantages of the described construction are as follows:

The pipes may be readily removed when worn out, and new ones be inserted without interfering with the work of the furnace.

The pipes also, being more uniformly heated, will last for a greater length of time.

A larger number of pipes can be placed in a given space owing to the compact arrangement, and the heating-surface be correspondingly increased.

By means of the increased heating-surface, and the more perfect exposure of the pipes to the action of the gas and flame, a higher temperature may be obtained.

We are aware that sleeves or collars have been before used for the purpose of connecting hot-blast-oven pipes.

We are also aware that the independent pipe-sections have been supported on the dividing-walls of said ovens; but,

Having thus fully described our invention, what we claim as new, and desire to secure by Letters Patent, is—

1. In combination with the packing-sleeve D, supported by the walls $a^4$ $a^5$ $a^6$, the independent sectional pipes C, whereby any member of the series can be removed from the top of the furnace without disturbing the remaining members.

2. In combination with a series of U-shaped oven-pipes having an intermediate web provided with an opening, as described, a packing-sleeve, D, substantially as set forth.

This specification signed and witnessed this 30th day of December, 1876.

WILLIAM A. MILES.
JOHN H. BURGHARDT.

Witnesses:
M. WARNER,
H. J. DUNHAM.